United States Patent
Rikhoff et al.

(10) Patent No.: US 8,329,810 B2
(45) Date of Patent: Dec. 11, 2012

(54) ELASTOMERIC COMPOUNDS CONTAINING RECYCLED MATERIALS AND SILICA

(75) Inventors: Robert Stephen Rikhoff, Prairieville, LA (US); Lawrence Douglas Harris, Baton Rouge, LA (US); Gregory Neville Nelson, New Orleans, LA (US)

(73) Assignee: Lion Copolymer, LLC, Baton Rouge, LA (US)

( * ) Notice: Subject to any disclaimer, the term of this patent is extended or adjusted under 35 U.S.C. 154(b) by 0 days.

(21) Appl. No.: 12/984,295

(22) Filed: Jan. 4, 2011

(65) Prior Publication Data
US 2011/0166263 A1  Jul. 7, 2011

Related U.S. Application Data

(60) Provisional application No. 61/292,923, filed on Jan. 7, 2010.

(51) Int. Cl.
  B60C 1/00 (2006.01)
  C08K 11/00 (2006.01)
(52) U.S. Cl. .......................... 524/526; 524/15
(58) Field of Classification Search ............... 524/526
  See application file for complete search history.

(56) References Cited

U.S. PATENT DOCUMENTS

| | | | |
|---|---|---|---|
| 4,076,769 A | 2/1978 | Watts | |
| 4,213,888 A | 7/1980 | Karg et al. | |
| 5,093,407 A | 3/1992 | Komai et al. | |
| 5,304,591 A | 4/1994 | Nowakowsky et al. | |
| 5,504,168 A | 4/1996 | Maestri et al. | |
| 5,985,953 A * | 11/1999 | Lightsey et al. | 523/212 |
| 6,403,693 B2 | 6/2002 | Materne et al. | |
| 6,579,929 B1 | 6/2003 | Cole et al. | |
| 6,635,700 B2 | 10/2003 | Cruse et al. | |
| 7,585,914 B2 | 9/2009 | Tsou et al. | |
| 2004/0071626 A1 | 4/2004 | Smith et al. | |
| 2005/0009961 A1* | 1/2005 | Burris et al. | 524/59 |
| 2006/0100320 A1 | 5/2006 | Dalphond et al. | |
| 2007/0106024 A1 | 5/2007 | Tsou et al. | |
| 2007/0260005 A1 | 11/2007 | Karato et al. | |
| 2008/0221274 A1 | 9/2008 | Jourdain | |
| 2009/0124730 A1 | 5/2009 | Matsuda et al. | |

FOREIGN PATENT DOCUMENTS

JP   2005-33019 A   12/2005

OTHER PUBLICATIONS

United Chemical Products, product data sheet of SBR 1502, Aug. 2004.*
Perez, et al. "Effect of the Filler Characteristics on Miscibility of Styrene-Butadiene Rubber and Nitrile-Butadiene Rubber Blends." Polymer Engineering and Science [online], Published online Aug. 25, 2008; Retrieved from the Internet: <URL: http://onlinelibrary.wiley.com.

* cited by examiner

*Primary Examiner* — Hui Chin
(74) *Attorney, Agent, or Firm* — Buskop Law Group, PC; Wendy Buskop

(57) ABSTRACT

A recycled elastomeric composition that can include a natural rubber, a synthetic elastomeric polymer, or combinations thereof is described herein. The synthetic elastomeric polymer can include butadiene and styrene. The recycled elastomeric composition can also include a compatibilized silica with a coupling agent, a crumb rubber, a carbon black, a filler, and an extender oil. Articles comprising the recycled elastomeric composition can include: floor mats, tires, belts, rollers, footwear, wire or cable jacketing, roof edging, tubulars, and marine impact bumpers.

16 Claims, No Drawings

ELASTOMERIC COMPOUNDS CONTAINING RECYCLED MATERIALS AND SILICA

CROSS REFERENCE TO RELATED APPLICATIONS

The present application claims priority to and the benefit of U.S. Provisional Patent Application Serial No. 61/292,923 filed on Jan. 7, 2010, entitled "ELASTOMERIC COMPOUNDS CONTAINING RECYCLED MATERIALS AND SILICA". This reference is hereby incorporated in its entirety.

FIELD

The present embodiments generally relate to a recycled elastomeric composition, including an elastomeric composition, a rubber material, such as rubber crumb, a compatibilized silica, and carbon black.

BACKGROUND

A need exists for a recycled elastomeric compound that saves energy during production and lowers production cost.

A need exists for a recycled elastomeric compound that has "green" characteristics, such as a rubber that is recaptured and recycled.

A need exists for an elastomeric material that reduces transportation costs by not using raw hydrocarbons that typically come from offshore deep sea wells and are very expensive.

A need exists for an elastomeric compound that contains recycled materials and uniformly incorporated silica.

A further need exists for an elastomeric compound that contains recycled materials, which reduces the amount of rubber in landfills.

The present embodiments meet these needs.

DETAILED DESCRIPTION OF THE EMBODIMENTS

Before explaining the present composition and article in detail, it is to be understood that the composition and article are not limited to the particular embodiments and that the composition and article can be practiced or carried out in various ways.

The present embodiments relate to an elastomeric polymeric composition with crumb rubber and silica formed using a continuous flow, a zero to low pressure, ambient to slightly above ambient temperature, emulsion polymerization with an activator, a free radical initiator, water, and a terminating agent.

The elastomeric polymeric composition with crumb rubber and silica can have from 18 percent to 93 percent by weight based on the total weight of the composition of a synthetic elastomeric polymer.

The synthetic elastomeric polymer can contain from 60 percent to 82 percent by weight of liquid 1,3-butadiene monomer based on the total weight of the elastomeric polymeric composition.

The elastomeric polymeric composition with crumb rubber and silica can have from 18 percent to 40 percent by weight of a styrene monomer based on the total weight of the elastomeric polymeric composition.

The elastomeric polymeric composition with crumb rubber and silica can have from 5 percent to 80 percent by weight of a compatibilized silica based on the total weight of the elastomeric polymeric composition. The compatibilized silica can have at least 1 percent by weight of an organosilicon coupling agent bound to about 20 percent by weight (wt %) of a surface of the compatibilized silica.

The elastomeric polymeric composition with crumb rubber and silica can have from 1 percent to 50 percent by weight, based on the total weight of the composition, of a recycled crumb rubber.

The elastomeric polymeric composition with crumb rubber and silica can have from 1 percent to 40 percent by weight, based on the total weight of the composition, of a carbon black.

The elastomeric polymeric composition with crumb rubber and silica can have particles of reclaimed rubber therein. At least 50 percent by volume of the crumb rubber particles can be smaller than a #10 mesh U.S. series sieve.

The elastomeric polymeric composition with crumb rubber and silica can have particles of reclaimed rubber therein. At least 50 percent by volume of the crumb rubber particles can be smaller than a #200 mesh U.S. series sieve.

During the emulsion polymerization to made the elastomeric polymeric composition, the synthetic elastomeric polymer can be in the form of a latex or a dry particulate.

The elastomeric polymeric composition with crumb rubber and silica can include crumb rubber be 100 percent sourced from recycled tires.

The elastomeric polymeric composition with crumb rubber and can include from 0.1 percent to 50 percent by weight of a filler based on the total weight of the composition.

The filler can be ground pecan shells, cellulosic materials, silage, diatomaceous earth, ground peanut shells, talc, ground coal, ground bagasse, ash, perlite, clay, calcium carbonate, biomass, or combinations thereof.

The elastomeric polymeric composition with crumb rubber and silica can include from 1 percent to 40 percent by weight of an extender oil based on the total weight of the composition.

The extender oil can be a synthetic oil, an aromatic oil, a naphthenic oil, a hydrocarbon, a polycyclic aromatic hydrocarbon oil, or combinations thereof.

The elastomeric polymeric composition with crumb rubber and silica can include up to 25 percent by weight of a thermoplastic polymer, a thermoplastic elastomer, a thermoplastic vulcanizate, or any combination thereof based on the total weight of the composition.

The elastomeric polymeric composition with crumb rubber and silica can be a composition of crosslinked polymers.

The elastomeric polymeric composition with crumb rubber and silica can include from 1 percent to 10 percent by weight of a carbon black based on the total weight of the composition.

The elastomeric polymeric composition with crumb rubber and silica can be used to make various types of articles.

The article can be a floor mat, a tire, a belt, a roller, footwear, wire and cable jacketing, roof edging, a tubular hose, a marine impact bumper, an industrial belt, a non-automotive tire, a mining belt, a bearing, a conduit, or the like.

The present embodiments relate to a recycled elastomeric composition and to articles made from the recycled elastomeric composition.

The natural rubber used herein can be any polyisoprene, such as a rubber from a rubber plant. The synthetic elastomeric polymer used herein can be a styrene butadiene rubber.

The synthetic elastomeric polymer can include from 60 percent to 82 percent by weight of liquid 1,3-butadiene, from 18 percent to 40 percent by weight of a styrene, from 5 percent to 80 percent by weight of a compatibilized silica having at least 1 percent by weight of a coupling agent bound to a surface of the compatibilized silica, from 1 percent to 50 percent by weight of a crumb rubber, and from 1 percent to 40 percent by weight of a carbon black.

A pinane hydroperoxide can be used in the emulsion polymerization.

The synthetic elastomeric polymer can be prepared by polymerizing and/or copolymerizing conjugated diene monomers, such as butadiene, isoprene, chloroprene, pentadiene, and dimethylbutadiene.

The synthetic elastomeric polymer can contain vinyl monomers and combinations of conjugated dienes with vinyl monomers.

Suitable vinyl monomers can include styrenes, alpha-methylstyrenes, alkyl substituted styrenes, vinyl toluene, divinylbenzene, acrylonitrile, vinylchloride, methacrylonitrile, isobutylene, maleic anhydride, acrylic esters and acids, methylacrylic esters, vinyl ethers, and vinyl pyridines.

The synthetic elastomeric polymer can include styrene-butadiene rubber (SBR), acrylonitrile-butadiene rubber (NBR), acrylonitrile-butadiene-styrene polymer (ABS), polybutadienes, polyvinylchloride (PVC), polystyrene, polyvinylacetate, butadiene-vinyl pyridine polymers, polyisoprenes, polychloroprene, neoprene, styrene-acrylonitrile copolymer (SAN), or blends of acrylonitrile-butadiene rubber with polyvinylchloride.

The resulting recycled elastomeric polymer can be made from blends, which can include up to 25 percent by weight of a thermoplastic polymer, thermoplastic elastomer, thermoplastic vulcanizates, or combinations thereof.

The thermoplastic polymer can be a thermoplastic polyolefin blend.

The thermoplastic elastomer can be styrene butadiene block copolymer.

The thermoplastic vulcanizate can be crosslinked ethylene propylene diene material in a polypropylene matrix.

The silica can constitute from 5 percent to 80 percent by weight of the overall composition.

The emulsion polymerization blending can be performed by using a banbury mixer mixing at a rate ranging from 800 pounds to 1200 pounds for a time period ranging from 90 seconds to 30 minutes.

In addition to blending the silica with the polymers already recited herein, the compatibilized silica can be blended with polyolefins, polyalpha.-olefins, polyesters, polyamides, polycarbonates, polyphenylene oxides, polyepoxides, polyacrylates, and copolymers of acrylates and vinyl monomers.

The polyolefins can be homopolymers, copolymers, crosslinked copolymers, and other comonomer combinations prepared from straight chain, branched, or cyclic alpha-monoolefins, vinylidene olefins, and nonconjugated di- and tri-olefins, including 1,4-pentadienes, 1,4-hexadienes, 1,5-hexadienes, dicyclopentadienes, 1,5-cyclooctadienes, octatrienes, norbornadienes, alkylidene norbornenes, vinyl norbornenes, and the like.

Examples of such polymers include polyethylenes, polypropylenes, ethylene-propylene copolymers, ethylene-alpha-olefin-nonconjugated diene terpolymers (EPDMs), chlorinated polyethylenes, polybutylene, polybutenes, polynorbornenes, and poly alpha-olefin resins.

To make the compatibilized silica usable herein, a silica can be treated with a coupling agent in an aqueous solution, forming a slurry for blending with the other components.

The silica can be made of a number of commercially available amorphous silica, such as precipitated or fumed silica, that have finely divided particle sizes and high surface areas.

The size of the silica particles can be varied within relatively wide ranges, such as from 7 nm to 60 nm, depending on the end use of the silica-filled or silica-reinforced polymer.

The finely divided silica can thus be formed into an aqueous slurry and treated with a coupling agent that can chemically bond to the silica surface.

Coupling agents known in the art can be used for coupling hydrophilic filler materials, such as glass fibers or silica, to hydrophobic materials, such as natural and synthetic elastomeric polymers useful as rubbers or thermoplastic materials.

Organosilicon compounds, well known for bonding silica to natural and synthetic elastomeric polymers, can be used as the coupling agent.

The organosilicon can have from one to three readily hydrolyzable groups bonded directly to a silicon atom.

At least 20 percent bonding can be accomplished with the coupling agent.

The hydrolyzable groups can be halogens, hydrogens, hydroxyls, lower alkoxy groups, such as methoxy, ethoxy, propoxy, and like groups.

In embodiments, one to three organic groups can be attached directly to the silicon atom that is compatible with the natural or synthetic elastomeric polymer to which the silica is to be added.

The coupling agent can have at least one organic group containing a functional group capable of chemical reaction with the natural or synthetic elastomeric polymer to which the silica is to be added. The functional groups can be amine groups, polyamino alkyl groups, mercapto groups, carbonyl groups, hydroxy groups, epoxy groups, halogens, ethylenically unsaturated groups, or the like.

The functional group can be chosen based on the particular polymer and the particular fabrication of the elastomeric compound.

For example, if an embodiment includes a styrene-butadiene rubber with silica, which can be cured via cross-linking reactions involving sulfur compounds, an organosilicon compound with at least one organic group that can have mercapto, polysulfide, thiocyanato (—SCN), a halogen and/or amino functionality, can be used as the coupling agent. Correspondingly, at least one organic group of the organosilicon compound can have ethylenic unsaturation or an epoxy group, such that the silica filled polymer can undergo a peroxy type of curing reaction.

The coupling agents imparting compatibilization to the natural and synthetic elastomeric polymers can include those from the groups consisting of: trialkylsilanes, dialkylsilanes, trialkylalkoxysilanes, trialkylhalosilanes, dialkyalkoxysilanes, dialkyldialkoxysilanes, dialkylalkoxyhalosilanes, trialkylsilanols, alkyltrialkoxysilanes, alkyldialkoxysilanes, alkyldialkoxyhalosilanes, and monoalkylsilanes, in which the alkyl group can be a C.sub.1-C.sub.18 linear, cyclic, or branched hydrocarbon, or combinations thereof. One or two alkyl groups can be replaced with a phenyl or benzyl group, or one to two alkyl groups can be replaced with a phenyl, benzyl, or alkoxy substituted alkyl group.

The coupling agent can have a structure similar to:

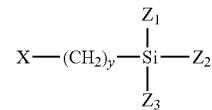

Within the structure, "X" can be a functional group selected from the group consisting of: an amino group, a polyamino alkyl group, a mercapto group, a polysulfide, an epoxy group, a vinyl group, an acryloxy group, and a methacryloxy group.

In embodiments, the functional group can be an organic group attached directly to the silicon atom.

The functional group can be a functional group capable of undergoing a chemical reaction with the natural rubber or the synthetic elastomeric polymer during curing of the natural rubber or synthetic elastomeric polymer. As such, a covalent bond between the coupling agent and the natural rubber, the synthetic elastomeric polymer, or combinations thereof can be provided.

Within the structure, "y" can be an integer equal to or greater than 0.

Within the structure, "Z.sub.1", "Z.sub.2", and "Z.sub.3" can be each independently selected from the group consisting of: hydrogen, $C_1$-$C_{18}$ alkyl, aryl, cycloalkyl, aryl alkoxy, and halo-substituted alkyl. At least one of "Z.sub.1", "Z.sub.2", and "Z.sub.3" can be an alkoxy, a hydrogen, a halogen, or a hydroxyl.

The coupling agent can be chemically bond to the natural rubber, the synthetic elastomeric polymer, or combinations thereof during curing of the natural rubber or synthetic elastomeric polymer.

The organosilicon can be derived from an organic silane.

In one or more embodiments, the organosilicon compound can have from 1 to 3 readily hydrolyzable groups attached directly to the silicon atom and at least 1 organic group attached directly to the silicon atom.

The coupling agent can have the capacity of chemically reacting with the surface of the silica to bond the coupling agent thereto. The coupling agent can be or can include bis(trialkoxysilylalkyl)polysulfide.

The bis(trialkoxysilylalkyl)polysulfide can have from 2 sulfur atoms to 8 sulfur atoms in which the alkyl groups can be $C_1$-$C_{18}$ alkyl groups, and the alkoxy groups can be $C_1$-$C_8$ alkoxy groups.

The amount of the coupling agent employed can be varied within relatively wide limits depending on the amount of silica to be blended with the natural or synthetic elastomeric polymer, and depending on the molecular weight of the coupling agent.

A range from 1 part to 25 parts of coupling agent per 100 parts by weight of silica can be used, such as from 1 part to 15 parts by weight of coupling agent per 100 parts by weight of silica.

The amount of coupling agent used can be defined in terms of the actual weight percent of organosilicon residing on the silica surface. Much of the weight of the coupling agent can be lost during reaction with the silica surface and condensation with itself.

To achieve greater than 90 percent by weight silica incorporation into the emulsion polymerized polymer, the weight percent of organosilicon on the surface of the silica can range from 0.50 to 10.0. As such, a minimum of 0.5 to 5 grams of organosilicon from the silane can be bound to 100 grams of silica charged to the slurry.

For enhanced compatibility in dry mix, or for additional chemical reaction with the natural or synthetic elastomeric polymers, greater than 1 percent by weight, such as 1 percent to 50 percent by weight, of organosilicon residue per weight of silica can be bound on the surface of the silica. For example, 10 percent to 20 percent by weight organosilicon can be bound on the surface of the silica.

The synthetic elastomeric polymer can have or include from about 55 percent by weight to about 92 percent by weight of a butadiene, such as liquid 1,3-butadiene ($CH_2$=CHCH=$CH_2$).

The synthetic elastomeric polymer can include from about 8 percent to about 45 percent by weight of a styrene. In embodiments, the synthetic elastomeric polymer can be in the form of a latex or a dry particulate.

"Latex", as the term is herein used, refers to a stable dispersion or emulsion of polymer micro-particles in a medium. Illustrative mediums can include water or other fluid. The latexes can be natural or synthetic.

In one embodiment, the elastomeric composition can include from about 5 percent by weight to about 80 percent by weight of compatibilized silica.

In another embodiment, the compatibilized silica can have at least 1 percent by weight of a coupling agent bounded to the surface of the compatibilized silica. In embodiments, the amount of coupling agent can range from about 1 percent by weight to about 50 percent by weight of coupling agent.

The recycled elastomeric composition can include from about 1 percent by weight to about 50 percent by weight of a crumb rubber.

"Crumb rubber" as the term is herein used, refers to material derived by reducing scrap tire or other rubber into uniform granules with the inherently reinforcing materials, such as steel and fiber removed along with any other type of inert contaminants such as dust, glass, or rocks.

The crumb rubber can include particles of reclaimed rubber. Reclaimed rubber can be recycled rubber, which can be derived from synthetic and/or natural rubbers or plastics. In embodiments, the crumb rubber can be made of 100 percent recycled tires.

At least a portion of the particles of reclaimed rubber can be passed through a #10 mesh U.S. series sieve, or a #200 mesh U.S. series sieve before the crumb rubber is incorporated into the rubber composition. For example, from 10 percent to 50 percent of the particles of reclaimed rubber can be passed through a #200 mesh or other mesh sieve.

Embodiments of the elastomeric composition can include from about 1 percent to about 40 percent by weight of a carbon black.

The carbon black can be a material consisting essentially of elemental carbon in the form of near-spherical colloidal particles and coalesced particle aggregates of colloidal size, obtained by partial combustion of thermal decomposition of hydrocarbons.

Two different types of carbon black can be used.

The elastomeric composition can include fillers, such as ground pecan shells, other cellulosic materials, silage, diatomaceous earth, ground peanut shells, talc, ground coal, ground bagasse, ash, perlite, clay, calcium carbonate, biomass, or combinations thereof.

Embodiments of the elastomeric composition can include from about 0.1 percent by weight to about 50 percent by weight of the filler.

Compositions can include "other materials", such as ultraviolet (UV) stabilizers, extender oils, antioxidants, or antioxidants. The composition can include "other materials" in amounts from about 0.1 percent to 3 percent by weight based on the total weight of the composition.

The ultraviolet (UV) stabilizer can be a hindered amine, a benzotriazole, a triazine, or combinations thereof.

The antioxidant can be a phenolic antioxidant, a phosphite, a bis-phenol, an amine antioxidant, or combinations thereof.

The extender oil can be a synthetic oil, an aromatic oil, a naphthenic oil, a hydrocarbon, a polycyclic aromatic hydrocarbon oil, or combinations thereof.

For example, the elastomeric composition can include from about 0.01 percent by weight to about 40 percent by weight of the extender oil. The extender oil can act as a plasticizer and allow for an enhanced processing.

Embodiments can include an article prepared from the rubber composition.

The article can include a floor mat, a tire, a belt, a roller, a gasket printer's roller, an o-ring, shoes, footwear, wire and cable jacketing, roof edging, a tubular, such as a garden hose or pipe, a marine impact bumper, such as a side bumper used for the docking of a boat, an industrial belt, non-latex gloves, non-automotive tires, a mining belt, a bearing, a gas mask, a conduit, a pneumatic tire used on bikes, cars, or airplanes.

EXAMPLE 1

Formation of the elastomeric composition can include first introducing 47 percent by weight of a synthetic elastomeric polymer into a finishing process area. The synthetic elastomeric polymer can include 70 percent by weight of butadiene and 30 percent by weight of styrene.

Next, 10 percent by weight of compatibilized silica can be added. The compatibilized silica can include 90 percent by weight silica and with 10 percent by weight of a coupling agent.

In addition, 25 percent by weight of a crumb rubber can be added to the finishing process area.

Furthermore, 8 percent by weight of a carbon black and 10 percent by weight of an extender oil can be added to the finishing process area.

The finishing process area can be kept at a temperature of 60 degrees Celsius and at an ambient pressure. The components of the composition can be allowed to react within the finishing process area for a time period of 38 minutes.

A soap, water, an activator, a free radical initiator, and a terminating agent can be used in the emulsion polymerization process to form long chain polymerization.

EXAMPLE 2

A crumb rubber slurry with from 2 percent to 15 percent solids can be prepared and held in an agitating heated holding tank. The crumb rubber slurry within the agitating heated holding tank can be introduced into a coagulation step of the manufacturing process.

Latex from the emulsion polymerization process can be treated with shortstop to kill or stop the polymerization reaction, and can then be further processed to remove unreacted monomers. Residual unreacted monomers can be removed via steam stripping, and the finished latex can be routed to latex storage tanks.

The finished latex can be pumped from the latex storage tanks into feed tanks. The finished latex can be blended in the feed tanks if necessary to achieve the product target molecular weight. The molecular weight can be determined indirectly by measuring Mooney viscosity of the finished latex.

Latex can be continuously pumped from the nitrile latex feed tank, nitrile and styrene butadiene latex feed tank, and/or styrene butadiene latex feed tank, and can be mixed with antioxidant and/or extender oil at a head tank where all components can mix together, forming a mixture that can be pumped into a carbex tank or the like.

The crumb rubber slurry can also be pumped into the carbex tank or the like at the prescribed rate based on the recipe. A compatibilized silica slurry, carbon black slurry, or combinations thereof can be added to the carbex tank or the like.

The carbex tank can overflow into a first coagulation tank. If neat or pure extender oil is used, as opposed to oil emulsion, the mixture can be routed through a series of in-line static mixers to facilitate thorough mixing and dispersion.

The mixture can flow into a heated and stirred coagulation tank where dilute sulfuric acid coagulant can be added. Aluminum sulfate and calcium chloride can be used as coagulants when running nitrile rubber (NBR). Acid can be fed based on pH control of the coagulation tank, whereas both alum and calcium chloride can be fed based on flow control. All three coagulants can serve to break the latex emulsion and cause newly coagulated rubber crumb to form. Control of newly coagulated crumb size can be the determining factor for coagulant addition and can take precedent over recipe values.

Tank contents can be thoroughly agitated to produce a vortex in the center of the tank. Process conditions, along with the addition of coagulant chemicals described herein can coagulate the mixture to form a fresh rubber crumb and water slurry.

When coagulated under the conditions described in Example 2, the latex, oil, compatibilized silica slurry, carbon black slurry, antioxidant, recycled crumb, and combinations thereof can be evenly dispersed. The combined recycled crumb and the slurry can overflow from the first to a second coagulation tank to provide additional residence time for coagulation.

A soap conversion tank can provide more residence time to complete the coagulation step. The complete coagulation can be achieved before material exits the soap conversion tank to avoid fouling of downstream equipment. A small amount of coagulation aid can be used during coagulation to facilitate clearing the serum and completing coagulation.

Centrifugal dewatering units, or spin dryers, can be used to mechanically reduce the moisture content of pigmented rubber crumb to approximately 35 percent to 40 percent by weight, allowing for a more energy-efficient dryer operation. Rubber crumb slurry leaving the wash water tank can enter a spin dryer and can be thrown against a cylindrical screen. Water can pass through the screen and be removed by gravity at the bottom of the spin dryer. The rubber crumb can move in an upward spiral path and can be discharged through an outlet at the top thereof and onto a classifier.

The classifier can be a vibrating conveyor equipped with grid bars. Grid spacing can be used to regulate crumb size. Smaller crumbs can fall through the grid bar spaces, while over-sized crumbs can remain on top of the grid bar and can be ejected via a side exit chute.

Acceptable crumb can be discharged from the classifier into a wet feed rotolock valve, which can feed a wet feed crumb blower. The wet feed rotolock valve can prevent blow back from the wet-feed crumb blower.

Rubber crumb can be fluidized in the spin dryer by means of air directed upwards from the bottom of the spin dryer. The upward motion of the air can partially support and suspend the rubber crumb to form a boiling mass.

Dried crumb can be discharged through openings at the end of the last dryer compartment to a crumb hopper.

Discharge crumb hoppers can feed the dry crumb blowers. The dry crumb blowers can convey the dry crumb to baler scale cyclones. The rubber crumb can be gravity feed to scales above each baler, where the rubber crumb can be compressed into bale form.

The rubber crumb can be diverted to a bagging operation where it can be coated with a partitioning agent and packaged as a free flowing crumb.

While these embodiments have been described with emphasis on the embodiments, it should be understood that within the scope of the appended claims, the embodiments might be practiced other than as specifically described herein.

What is claimed is:

1. A dry crumb elastomeric polymeric composition with crumb rubber and silica formed using a continuous flow emulsion polymerization with an activator, a free radical initiator, water, and a terminating agent, wherein the continuous flow emulsion polymerization is performed at no pressure or low pressure and at ambient to above ambient temperature, the composition comprising:
   a. eighteen percent to ninety three percent by weight of a synthetic elastomeric polymer based on a total weight of the composition, wherein the synthetic elastomeric polymer comprises:
      (i) sixty percent to eighty two percent by weight of a liquid 1,3-butadiene monomer based on the total weight of the composition; or
      (ii) eighteen percent to forty percent by weight of a styrene monomer based on the total weight of the composition;
   b. five percent to eighty percent by weight of a compatibilized silica based on the total weight of the composition, wherein the compatibilized silica has at least one percent by weight of an organosilicon coupling agent bound to at least twenty percent by weight of a surface of the compatibilized silica;
   c. from one percent to fifty percent by weight of a recycled crumb rubber based on the total weight of the composition; and
   d. from one percent to forty percent by weight of a carbon black based on the total weight of the composition, wherein the synthetic elastomeric polymer, the compatibilized silica, the recycled crumb rubber, and the carbon black are coagulated and dried to form the dry crumb elastomeric polymeric composition.

2. The dry crumb elastomeric polymeric composition with crumb rubber and silica of claim 1, wherein the recycled crumb rubber comprises particles of reclaimed rubber, and wherein at least fifty percent by volume of the particles of reclaimed rubber are smaller than a #10 mesh U.S. series sieve.

3. The dry crumb elastomeric polymeric composition with crumb rubber and silica of claim 1, wherein the recycled crumb rubber comprises particles of reclaimed rubber, and wherein at least fifty percent by volume of the particles of reclaimed rubber are smaller than a #200 mesh U.S. series sieve.

4. The dry crumb elastomeric polymeric composition with crumb rubber and silica of claim 1, wherein the synthetic elastomeric polymer is in latex form or is a dry particulate.

5. The dry crumb elastomeric polymeric composition with crumb rubber and silica of claim 1, wherein the recycled crumb rubber is one hundred percent from recycled tires.

6. The dry crumb elastomeric polymeric composition with crumb rubber and silica of claim 1, further comprising from 0.1 percent to 50 percent by weight of a filler based on the total weight of the composition.

7. The dry crumb elastomeric polymeric composition with crumb rubber and silica of claim 6, wherein the filler is a member of the group consisting of: ground pecan shells, cellulosic materials, silage, diatomaceous earth, ground peanut shells, talc, ground coal, ground bagasse, ash, perlite, clay, calcium carbonate, biomass, and combinations thereof.

8. The dry crumb elastomeric polymeric composition with crumb rubber and silica of claim 1, further comprising from one percent to forty percent by weight of an extender oil based on the total weight of the composition.

9. The dry crumb elastomeric polymeric composition with crumb rubber and silica of claim 8, wherein the extender oil is selected from the group consisting of: a synthetic oil, an aromatic oil, a naphthenic oil, a hydrocarbon, a polycyclic aromatic hydrocarbon oil, and combinations thereof.

10. The dry crumb elastomeric polymeric composition with crumb rubber and silica of claim 1, further comprising up to twenty five percent by weight of hydrophobic materials, wherein the hydrophobic materials comprise thermoplastic polymers, thermoplastic elastomers, thermoplastic vulcanizates, or combinations thereof based on the total weight of the composition.

11. The dry crumb elastomeric polymeric composition with crumb rubber and silica of claim 1, wherein the monomers are cross-linked.

12. The dry crumb elastomeric polymeric composition with crumb rubber and silica of claim 1, wherein the carbon black is present in an amount ranging from one percent to ten percent by weight based on the total weight of the composition.

13. A dry crumb elastomeric polymeric composition with crumb rubber and silica article comprising the composition of claim 1.

14. The dry crumb elastomeric polymeric composition with crumb rubber and silica article of claim 13, wherein the article is: a floor mat, a tire, a belt, a roller, footwear, wire and cable jacketing, roof edging, a tubular hose, a marine impact bumper, an industrial belt, a non-automotive tire, a mining belt, a bearing, or a conduit.

15. The dry crumb elastomeric polymeric composition with crumb rubber and silica of claim 1, further comprising a partitioning agent coated on the dry crumb elastomeric polymeric composition forming a free flowing crumb.

16. The dry crumb elastomeric polymeric composition with crumb rubber and silica of claim 1, wherein the synthetic elastomeric polymer, the compatibilized silica, the recycled crumb rubber, and the carbon black are evenly dispersed within the dry crumb elastomeric polymeric composition.

* * * * *